US 6,665,712 B2

(12) United States Patent
Pickup

(10) Patent No.: US 6,665,712 B2
(45) Date of Patent: Dec. 16, 2003

(54) SYSTEM AND METHOD FOR LOCATING AN OUTPUT DEVICE

(75) Inventor: Ray L Pickup, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/060,884

(22) Filed: Jan. 30, 2002

(65) Prior Publication Data

US 2003/0142016 A1 Jul. 31, 2003

(51) Int. Cl.$^7$ .......................... G06F 15/16; H04B 7/185; G01S 3/02
(52) U.S. Cl. ............. 709/219; 342/357.08; 342/357.17; 342/464; 709/217; 709/218
(58) Field of Search .................. 342/357.08, 357.09, 342/357.1, 357.13, 357.17, 464, 463; 455/3.06; 358/1.1, 1.15, 305, FOR 155, FOR 142; 709/1–400, FOR 100–FOR 173

(56) References Cited

U.S. PATENT DOCUMENTS

| | | | |
|---|---|---|---|
| 5,512,879 A | 4/1996 | Stokes | |
| 5,661,471 A | 8/1997 | Kotlicki | |
| 6,246,376 B1 * | 6/2001 | Bork et al. ............ | 342/357.13 |
| 6,327,535 B1 | 12/2001 | Evans et al. | |
| 6,430,498 B1 * | 8/2002 | Maruyama et al. .... | 342/357.08 |
| 2001/0029531 A1 | 10/2001 | Ohta | |
| 2001/0034747 A1 | 10/2001 | Fujitani et al. | |
| 2001/0034774 A1 | 10/2001 | Watanabe et al. | |
| 2002/0002592 A1 * | 1/2002 | Aoki et al. .............. | 709/211 |
| 2002/0026479 A1 * | 2/2002 | Aoki et al. .............. | 709/218 |
| 2002/0051178 A1 * | 5/2002 | Nakayasu et al. ......... | 358/1.15 |
| 2002/0059383 A1 * | 5/2002 | Katsuda ..................... | 709/206 |
| 2002/0078204 A1 * | 6/2002 | Newell et al. ............ | 709/225 |
| 2003/0035122 A1 * | 2/2003 | Amarger et al. ............ | 358/1.1 |

OTHER PUBLICATIONS

Context–aware computing applications, Schilit, B.; Adams, N.; Want, R., Proceedings of the Workshop on Mobile Computing Systems and Applications, p. 85–90, Dec. 1994.*
Bluetooth—The universal radio interface for ad hoc, wireless connectivity, Jaap Haartsen, Ericsson Review, No. 3, 9. 110–117, 1998.*
E–911 location standards and location commercial services, WAng, S.S.; Green, M.; Malkawa, M., 2000 IEEE Emerging Technologies Symposium: Broadband, Wireless Internet Access, p. 1–5, 2000.*
HP patent application, Ser. No. 09/771,816, "Apparatus And Method For Selecting Wireless Devices," filed Jan. 29, 2001.

* cited by examiner

Primary Examiner—Thomas H. Tarcza
Assistant Examiner—Fred H Mull
(74) Attorney, Agent, or Firm—Gregg W. Wisdom

(57) ABSTRACT

A system to locate an output device includes a wireless device including a configuration to display output device information used to locate the output device selected for a printing operation, where the wireless device includes a configuration to receive and store the output device information. The system also includes a storage device configured to store the output device information and to send the output device information to the wireless device. A method for locating an output device includes receiving output device information used to locate the output device selected for a printing operation from a storage device, using a wireless device. In addition, the method includes displaying the output device information for the output device selected for the printing operation on the wireless device.

14 Claims, 6 Drawing Sheets

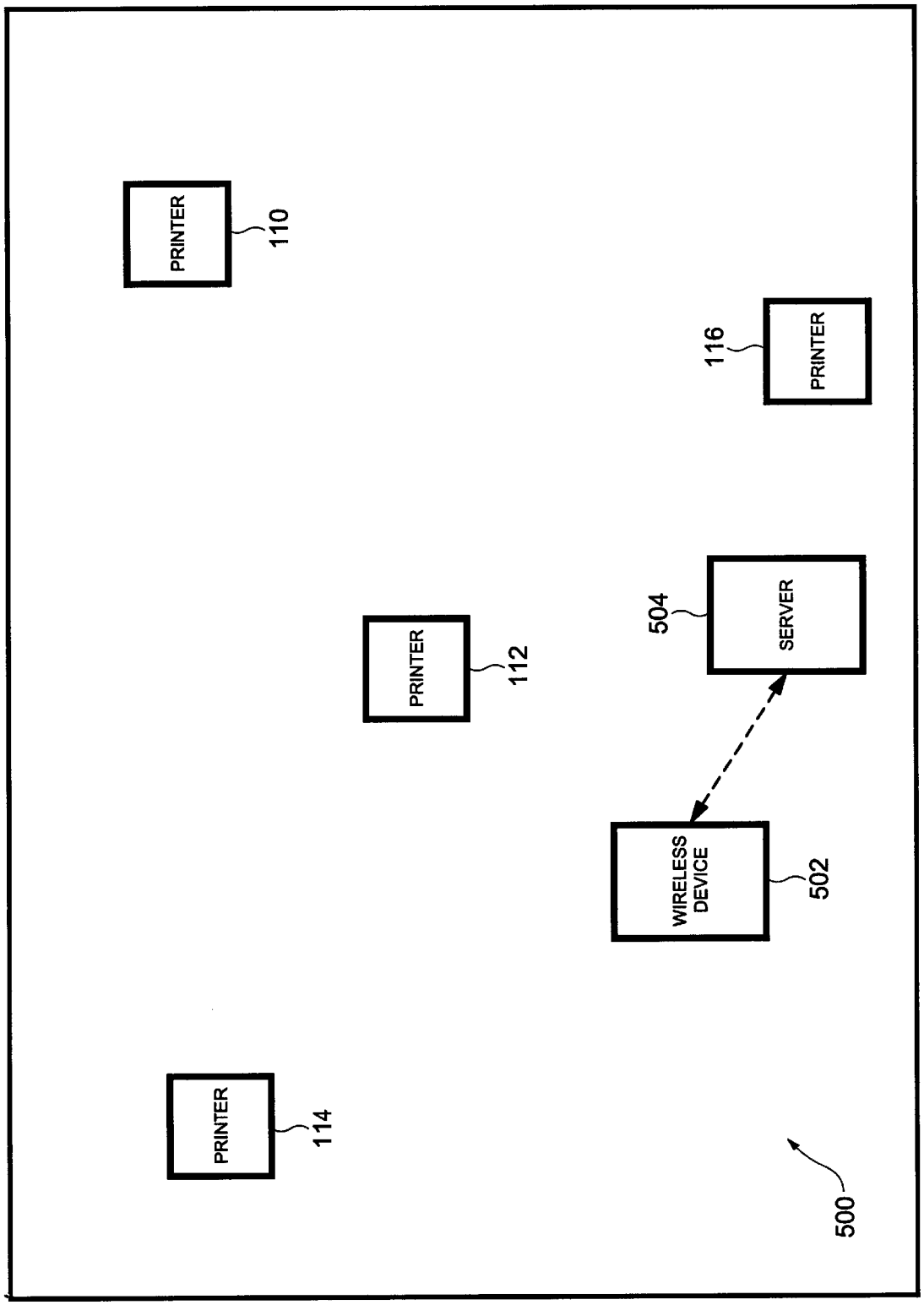

SYSTEM AND METHOD FOR LOCATING AN OUTPUT DEVICE

Devices having wireless capability (referred to generically as wireless devices), such as cell phones, some types personal digital assistants (PDAs), and some types of mobile computing devices have the capability for wireless delivery of documents for printing to an output device such as a printer, plotter, copier, fax machine, all in one device, or the like. Through some type of RF communication protocol a user may locate a device that can receive the document and execute the printing operation. The delivery of the document for printing may be done directly to a wireless enabled output device, to a personal computer coupled to a local output device or network output device, or to a server coupled to a network output device, where the document is stored on the wireless device. Alternatively, the document may be stored remotely from the wireless device and the wireless device is used to direct the remotely stored document to a device for printing.

Frequently, an initiator of the document printing desires that the document is printed on an output device having certain capabilities. Some of those capabilities may include, for example color printing, document stapling, high resolution printing, printing with ink, printing with toner, or printing on special media types. When initiating printing of the document, the user may select an output device, having the closest match to the desired capabilities, from several available types of output devices for printing of the document. However, determining the physical location of the selected output device, to which the document was directed for printing, to retrieve the document may be difficult. This may occur, for example, when the initiator is positioned out of the line of sight of the selected output device (as might be the case when the initiator is in a large building or multi-story building) or when printing of the document may have been completed on any one of a large number of nearby output devices. It would be helpful to easily locate the output device selected for printing the document.

SUMMARY OF THE INVENTION

A system to locate an output device includes a wireless device including a configuration to determine and display wireless device location information related to an area using a signal, to display area information, and to determine and display direction information to the output device, where the wireless device includes a configuration to receive and store the area information. The system also includes a storage device configured to store the area information and to send the area information to the wireless device.

A method for locating an output device in an area includes receiving area information, including a position of the output device, for the area using a wireless device. The method also includes receiving a position signal with the wireless device and determining wireless device position information related to the area using the position signal. In addition, the method includes determining direction information to the output device and displaying the area information on the wireless device. Furthermore, the method includes displaying the wireless device position information on the wireless device and displaying the direction information on the wireless device.

A system to locate an output device includes a wireless device including a configuration to display output device information used to locate the output device selected for a printing operation, where the wireless device includes a configuration to receive and store the output device information. The system also includes a storage device configured to store the output device information and to send the output device information to the wireless device.

A method for locating an output device includes receiving output device information used to locate the output device selected for a printing operation from a storage device, using a wireless device. In addition, the method includes displaying the output device information for the output device selected for the printing operation on the wireless device.

DESCRIPTION OF THE DRAWINGS

A more thorough understanding of embodiments of the locating system may be had from the consideration of the following detailed description taken in conjunction with the accompanying drawings in which:

Shown in FIG. 1 is a simplified block diagram of a first embodiment of the locating system.

Figure 2:
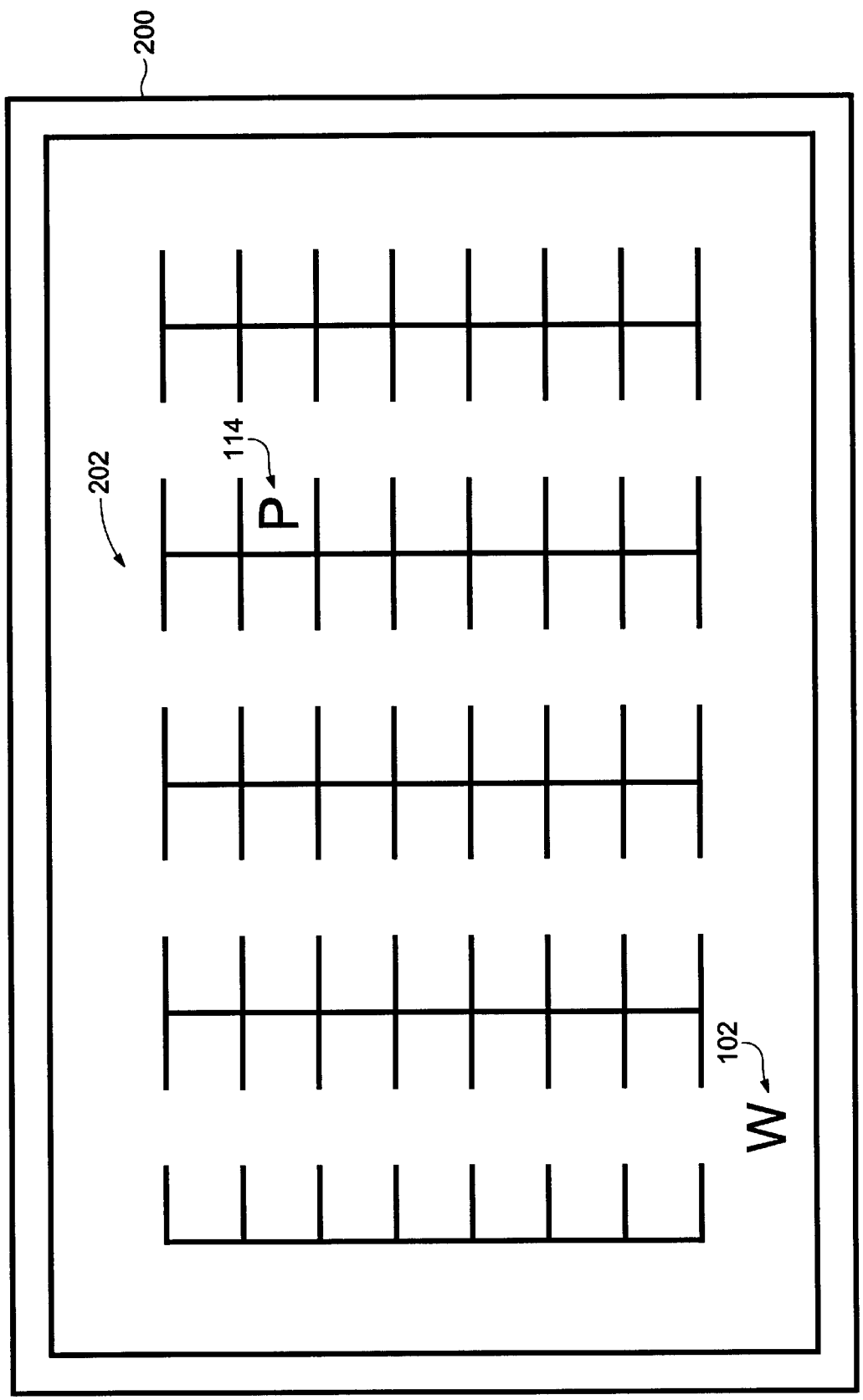
Figure 3:
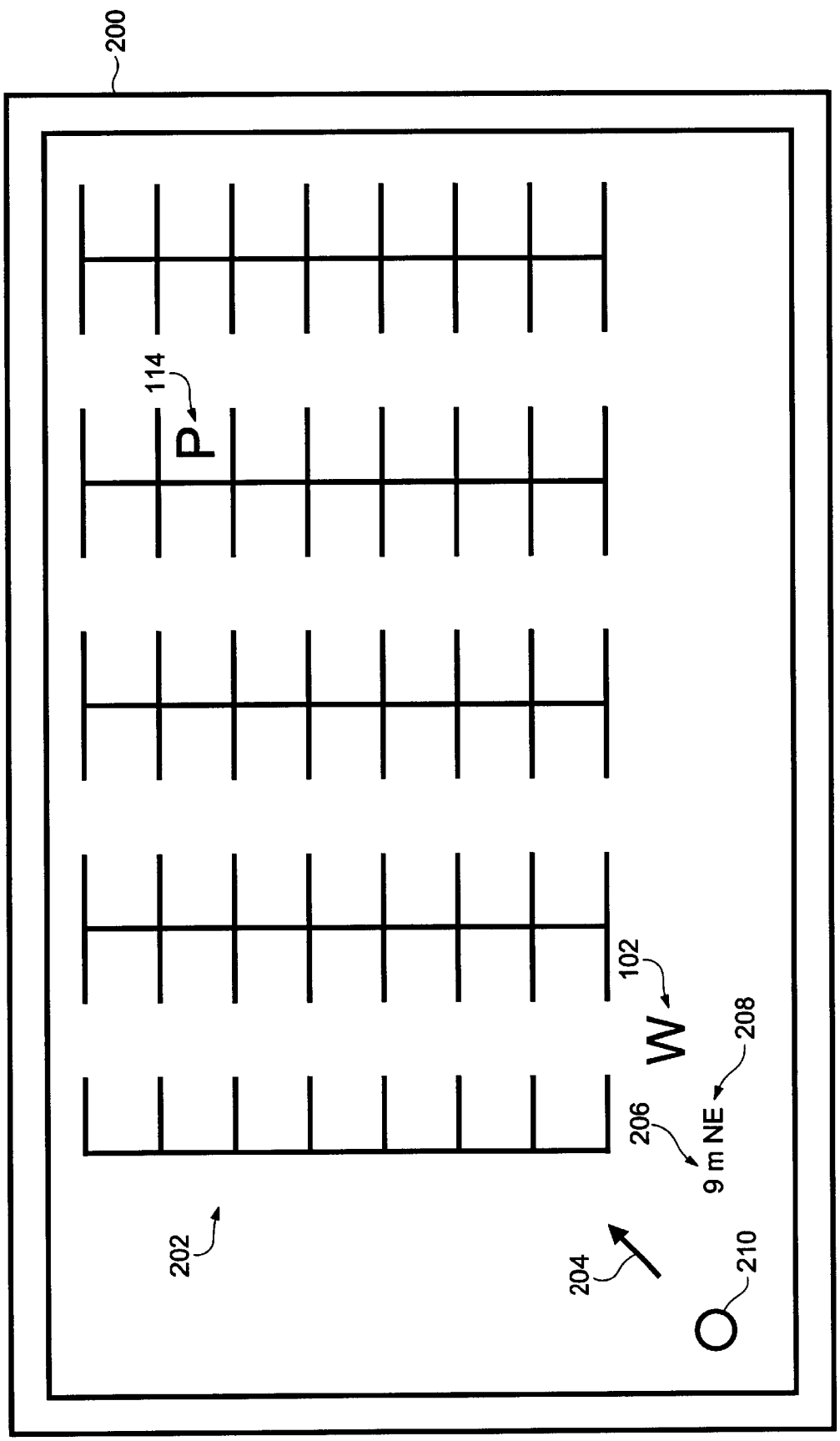

Shown in FIG. 2 is a simplified drawing of information that could be displayed on a wireless device Shown in FIG. 3 is a simplified drawing of information that could be displayed on a wireless device.

Figure 4:
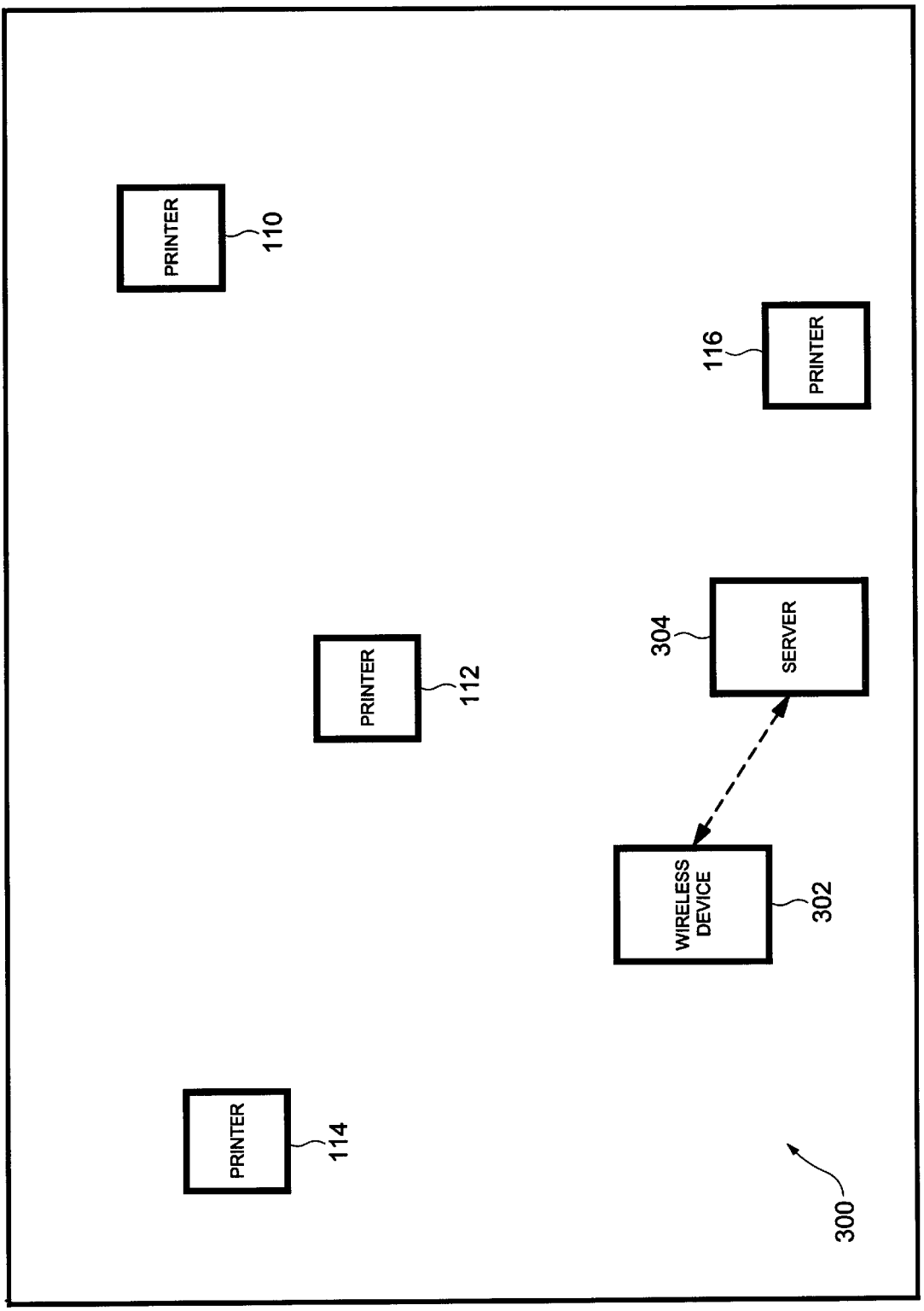

Shown in FIG. 4 is a simplified block diagram of a second embodiment of the locating system.

Figure 5:
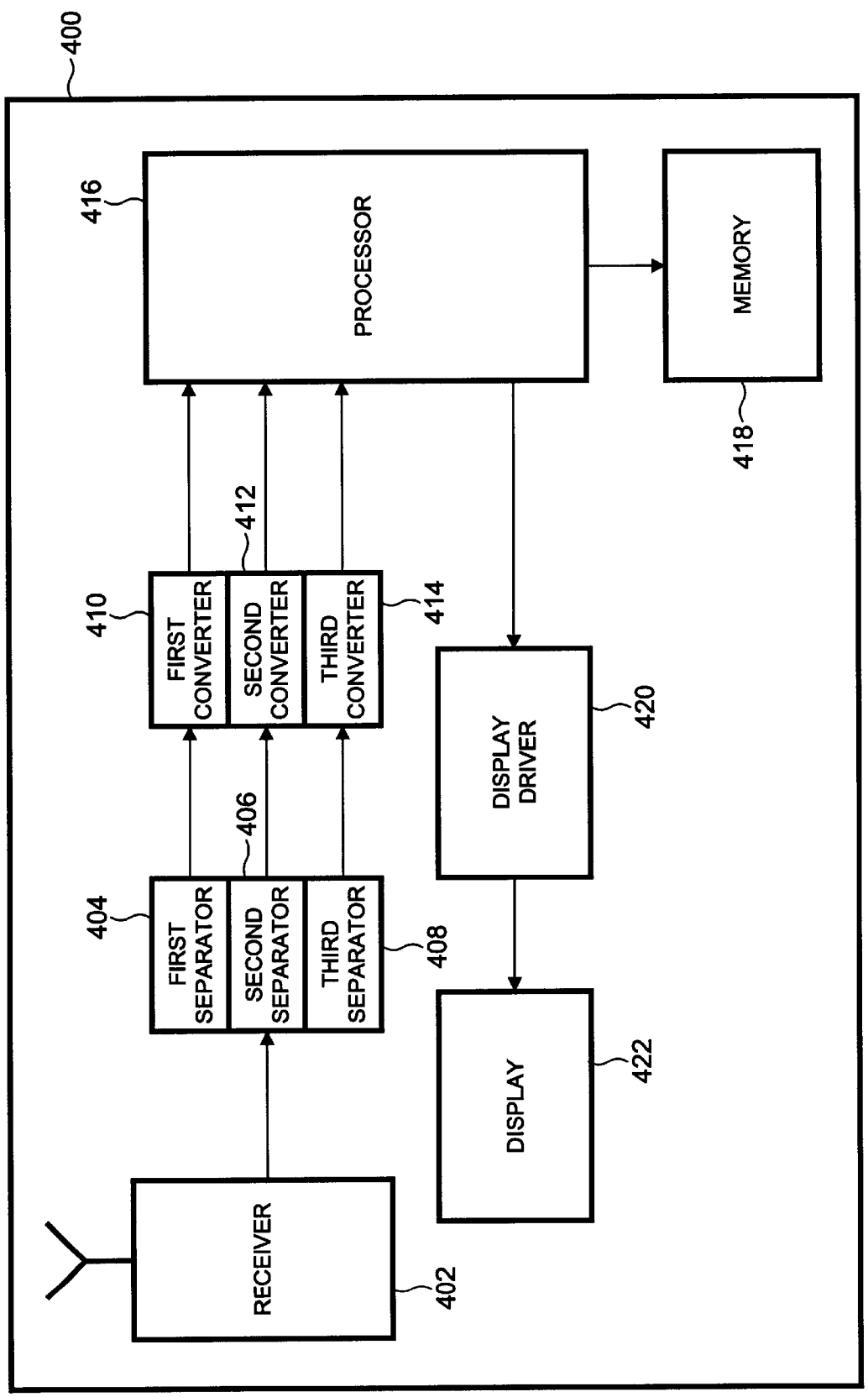

Shown in FIG. 5 is a high level block diagram of an exemplary wireless device that could be used in an embodiment of the locating system.

Shown in FIG. 6 is a simplified block diagram of a third embodiment of the locating system.

DETAILED DESCRIPTION OF THE DRAWINGS

Although embodiments of the locating system will be described in the context of locating a printer, it should be recognized that the embodiments of the locating system are applicable to a wide variety of output devices such as, copiers, fax machines, plotters, all in one devices (which may include a printer, a fax machine, and a scanner), and the like. In addition, although embodiments of the locating system will be described in the context of locating an output device in an area such as a building, the locating system may be usefully applied for locating an output device in other types of areas. For example, a user may initiate a printing operation while in transit (for example, traveling by automobile to a location at which the output device is located) and receive information that directs the user to the site on which the output device is located and allows the user to locate the output device once at the site.

Figure 1:
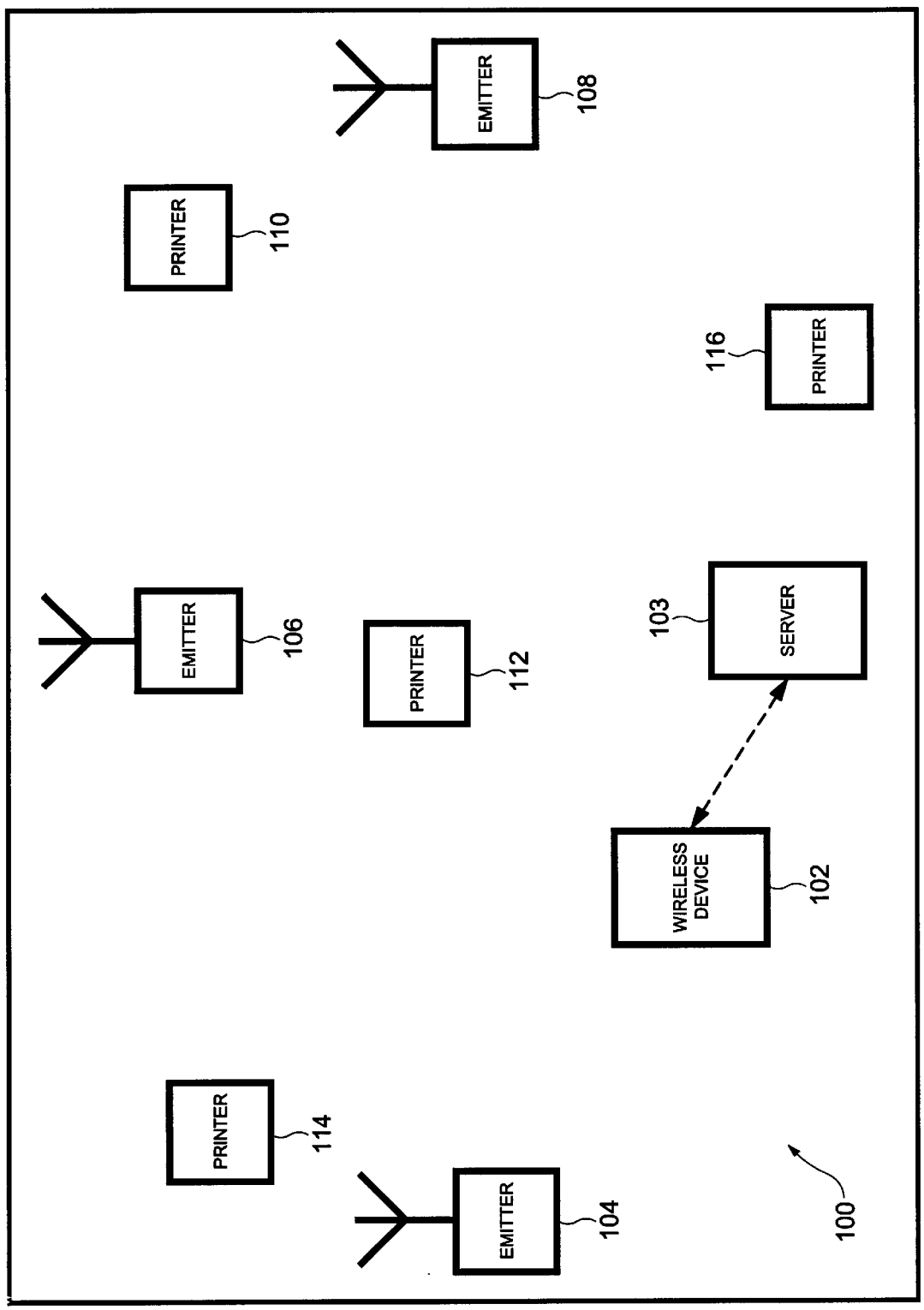

Shown in FIG. 1 is a high level block diagram of a first embodiment of the locating system, output device locating system 100. Output device locating system 100 includes wireless device 102, first emitter 104, second emitter 106, and third emitter 108. The emitters are located, for example, around a perimeter of a building. First emitter 104, second emitter 106, and third emitter 108 transmit electromagnetic energy (typically, in the radio frequency portion of the spectrum) in the form of periodic signals. The electromagnetic signals radiated from first emitter 104, second emitter 106, and third emitter 108 have characteristics that permit a receiver to differentiate between the transmitted signals. In addition, first emitter 104, second emitter 106, and third emitter 108 are located to allow position determination by a receiver having the capability to receive all three signals. Typically, first emitter 104, second emitter 106, and third emitter 108 each include an antenna suitable for transmitting a local broadcast signal.

Wireless device 102 includes receivers for receiving the transmitted signals from first emitter 104, second emitter 106, and third emitter 108 and differentiating between them. In addition, wireless device 102 includes the computational capability (implemented, for example, using a microprocessor or ASIC and associated firmware) for determining its position relative to the three emitters using the signals received from the three emitters. Area information, such as information defining a map of the building in which the emitters are located or information specifying the location of output devices, could be downloaded by wireless device 102 (either through a wireless connection or a direct connection as represented by the dashed line) from an embodiment of a storage device, such as server 103, located in the building or elsewhere. The area information could additionally include information about an area external to the building or information about only a portion of the building. Alternatively, an embodiment of the storage device could include one of the output devices that has the capability to store the area information and send it to wireless device 102, a personal computer having this capability, or the like. In that alternative, server 103 would not be needed for storing the area information. Wireless device 102 stores the downloaded area information within it. The information defining the map also includes information specifying the location of first emitter 104, second emitter 106, and third emitter 108 within the map. Using the signals received from the three emitters and the information defining the map, wireless device 102 determines wireless device location information, for example the location of wireless device 102 on the map (and therefore, the location of a user holding it) within the building.

The information defining the map also includes information specifying the location of the output devices (such as printers 110–116) within the building. When the user of wireless device 102 selects a printer for printing and initiates the printing of a document (where, as previously mentioned, the document could be transmitted from wireless device 102 or delivered for printing from a remote location), wireless device 102 displays the location of the selected printer within the building on the map along with the location of wireless device 102. With this information the user can more easily find the printer on which the document is printed. Shown in FIG. 2 is a simplified drawing of a display 200 on wireless device 102. Typically, display 200 is an LCD type display. Display 200 shows the location of selected printer 114 (designated by "P") and the location of wireless device 102 (designated by "W") within map 202 of the building. This allows the user to more quickly reach printer 114 and retrieve the printed document.

Shown in FIG. 3 is an alternative set of information that display 200 could display to assist a user in locating the output device upon which the document was printed. In this alternative, display 200 includes direction information, such as directional arrow 204, that is updated as the user holding wireless device 102 moves about the building. Directional arrow 204 shows the direction the user must go from their current position to reach printer 114 (the printer on which the document was printed). Directional arrow 204 is orientated to point to printer 114 with wireless device held by the user so that display 200 is in its normal viewing position. In addition to directional arrow 204, display 200 could include other kinds of direction information, such as a distance value 206 from printer 114 to wireless device 102, that is updated as the user holding wireless device 102 moves about the building. Distance value 206 is computed by wireless device using the location coordinates for printers 110–116 downloaded by wireless device 102. Displayed adjacent to distance value 206 is direction parameter 208 that provides basic compass direction information to the selected printer. The basic compass direction information specifies the direction to the printer in terms of the four compass directions (north, south, east, west) and the directions in between them (northwest, southwest, southeast, northeast) in abbreviated form (N, S, E, W, NW, SW, SE, and NE).

Proximity indicator 210 flashes at a rate related to distance value 206. As distance value 206 decreases (when the user holding wireless device 102 moves closer to the location of printer 114) proximity indicator 210 flashes more rapidly indicating the reduced distance. As an alternative to proximity indicator 210, wireless device 102 could use an audible beeper to indicate that wireless device 102 is getting closer to the selected output device. As the distance between wireless device 102 and printer 114 (where printer 114 is the selected output device) is reduced, the frequency of the audible beeping increases. It should be recognized that using proximity indicator 210 without directional arrow 204, distance value 206, or direction parameter 208 to guide a user to a selected output device improves the ease of a user in locating an output device selected for printing. Furthermore, it should be recognized that a wireless device making use of any one or several of map 202, or direction information such as, directional arrow 204, distance value 206, direction parameter 208, or proximity indicator 210, could be usefully employed to assist a user in locating the one of printers 110–116 upon which a document is printed.

Shown in FIG. 4 is a second embodiment of the locating system, output device locating system 300. In output device locating system 300, wireless device 302 includes a Global Positioning System (GPS) receiver for receiving position signals transmitted from global positioning satellites. Wireless device 302 downloads a map of the building from a server with features on the map specified in terms of GPS coordinates. For example, the locations of printers 110–116 are specified in terms of GPS coordinates as are the locations of walls and partitions. Wireless device 302 includes the capability to compute its position within the building using the received GPS signals. A display included in wireless device 302 displays the locations of printers 110–116 and the locations of partitions and walls within the buildings in a fashion similar to map 202. The information defining the map could be downloaded by wireless device (either through a wireless connection or a direct connection as represented by the dashed line) from an embodiment of a storage device, such as server 304, located in the building or elsewhere. As was the case for wireless device 102, the display in wireless device 302 could display a directional arrow, a distance value, a direction parameter, and proximity indicator serving the same function as in the first embodiment of the locating system. As previously mentioned, embodiments of the locating system would provide a benefit to a user if they employed at least one of the map, the directional arrow, the distance value, the direction parameter, or the proximity indicator to improve the ease with which one of printers 110–116 could be located in a building.

An alternative of the first embodiment of the locating system or the second embodiment of the locating system could make use of the wireless communication ability of wireless device 102 or wireless device 302 to determine the location of the selected one of printers 110–116. For this alternative, printers 110–116, or nearby located emitters external to printers 110–116, transmit signals that specify the position coordinates of printers 110–116 within the building (for the first embodiment of the locating system) or transmit signals that specify the position of printers 110–116 in the coordinate system used in the global positioning system. Then, the wireless device displays the position of printers 110–116 on the display at the correct location on the map of the building, or provides in addition to that, one or more of a directional arrow to the selected printer, a distance value to the selected printer, a direction parameter to the selected printer, or a proximity indicator.

Shown in FIG. 5 is a simplified block diagram of an embodiment of an exemplary wireless device, wireless device 400, that could be used in the first embodiment of the locating system. Receiver 402 is configured to receive the three signals from first emitter 104, second emitter 106, and third emitter 108. First separator 404, second separator 406, and third separator 408 extract the corresponding signals from the combined signal provided by receiver 402. The signals from the emitters may be distinguished by the separators in a variety of ways. For example, the emitters could emit signals of different frequencies that are separated using analog or digital bandpass filtering techniques. Or, the signals from the emitters could be time division multiplexed and separated using timing windows synchronized to the signals from the emitters. Or, the signals could be digitally encoded and separated by digital decoding.

The signals from the separators are coupled to, respectively, first converter 410, second converter 412, and third converter 414. The output from first converter 410, second converter 412, and third converter 414 are coupled to processor 416. If the signals from the separators are analog, each of first converter 410, second converter 412, and third converter 414 include analog to digital converters. If the signals are digital, then first converter 410, second converter 412, and third converter 414 perform a conversion on the digital signals into a form useable by processor 416. Memory 418 is coupled to processor 416 and used for storing information defining a map of an area (such as a building) in which output devices are located. The information specifies the location of the output device, partitions, and walls within the area. Processor 416 uses the converted signals supplied by the converters to determine the position of wireless device 400 within the area.

Processor 416 is coupled to display driver hardware 420. Display driver hardware 420 generates the electrical signals used for illuminating display 422 using data received from processor 416. Display 422 could include, for example, an LCD display. Using the determined position of wireless device 400 within the area and the information specifying the location of the selected output device, processor 416 generates data (computationally, using a lookup table, or some combination of these) used for specifying: the orientation of a directional arrow on display 422, a distance value, a direction parameter, a flashing or beeping frequency of a proximity indicator. Processor 416 supplies the data for these parameters, the data specifying the map, the data for the position of wireless device 400, and the data specifying location of the selected output device on the map to display driver hardware 420. In response to this data, display driver hardware 420 generates the signals necessary for display 422 to display the map with the location of the selected output device, wireless device 400, the directional arrow, the distance value, the direction parameter and a proximity indicator (if a visual proximity indicator is used). A wireless device similar to wireless device 400 could be used with the second embodiment of the locating system with modification to the hardware and firmware so a position of the wireless device could be determined using a GPS signal. Also included within wireless device 400 (but for convenience not illustrated in FIG. 5) is the hardware necessary to permit wireless device 400 to wirelessly send and receive the information used for printing operations.

Shown in FIG. 6 is a simplified block diagram of a third embodiment of the locating system, output device locating system 500. Output device locating system 500 is less complex than the previously disclosed embodiments of the locating system. However, output device locating system 500 has the capability to deliver many of the benefits of the previously disclosed embodiments. Wireless device 502 downloads output device information from server 504 for output devices included in the building. After the user selects the output device on which the printing operation will be performed using wireless device 502, the output device information for the selected output devices is displayed on wireless device 502. The output device information relates to the identification or position (or both) of printers 110–114 or other output devices used for printing. The output device information permits the user to locate the output device selected for the printing operation. For example, the output device information could include a textual description of the location of the selected output device that will enable the user to follow the directions to find the output device, such as "proceed to the elevators on the 1st floor, take the elevator to the 2nd floor and proceed to the enclosed room at the center of the 2nd floor that contains the selected output device." Or, the output device information could include a type of location designator used to define positions within in the building containing the output devices, such as "post E7 in building 2", or near the intersection of two aisles in the building. Or, for the case in which the output devices are located in a common area, the output device information could include information that would allow for locating the selected output device through, for example, identification information unique to the selected output device (selected output device identification number, selected output device model number (if unique), a physical description of the output device, or the like).

Although several embodiments of the locating system have been illustrated and described, it is readily apparent to those of ordinary skill in the art that various modifications may be made to these embodiments without departing from the scope of the appended claims.

What is claimed is:

1. A system to locate an output device, comprising:
 a wireless device including a configuration to determine and display wireless device location information related to an area using a signal, to display area information, and to operate a proximity indicator to signal a user at a rate dependent upon a distance from the output device to the output device, where the wireless device includes a configuration to receive and store the area information; and
 a storage device configured to store the area information and to send the area information to the wireless device.

2. The system as recited in claim 1, wherein:
 the area information includes map information defining a map of the area and output device location information defining a location of the output device in the area.

3. The system as recited in claim 2, wherein:
 the storage device includes the output device configured to deliver the map information to the wireless device through a wireless link.

4. The system as recited in claim 2, wherein:
 the storage device includes a server configured to deliver the map information to the wireless device through a wireless link.

5. The system as recited in claim 4, wherein:

the wireless device includes a configuration to display the wireless device location information as a location of the wireless device on the map; and the wireless device includes a configuration to display the output device location information as the location of the output device on the map.

6. The system as recited in claim 5, wherein:

the direction information relates to the location of the wireless device relative to the location of the output device.

7. The system as recited in claim 6, wherein:

the wireless device includes a portable computing device.

8. The system as recited in claim 1, wherein:

the signal includes a GPS signal; and the wireless device includes a configuration to determine the wireless device location information using the GPS signal.

9. A system to locate an output device, comprising:

a wireless device including a configuration to determine and display wireless device location information related to an area using a signal, to display area information, and to operate a proximity indicator to signal a user at a rate dependent upon a distance from the output device, where the wireless device includes a configuration to receive and store the area information;

a storage device configured to store the area information and to send the area information to the wireless device:

a first emitter to emit a first component of the signal;

a second emitter to emit a second component of the signal; and a third emitter to emit a third component of the signal, where the wireless device includes a configuration to determine the wireless device location information using the first component, the second component, and the third component.

10. A method for locating an output device in an area, comprising:

receiving area information, including a position of the output device, for the area using a wireless device;

receiving a position signal with the wireless device;

determining wireless device position information related to the area using the position signal;

determining direction information to the output device;

displaying the area information on the wireless device;

displaying the wireless device position information on the wireless device; and operating a proximity indicator to signal a user at a rate dependent upon a distance from the output device on the wireless device.

11. The method as recited in claim 10, wherein:

receiving the position signal includes receiving a plurality of GPS signals.

12. A system, comprising:

a wireless device including means for receiving a signal, means for storing area information, means for processing to determine wireless device location information using the signal and to determine direction information to a location of an output device, means for displaying the wireless device location information, and the area information, and means for operating a proximity indicator to signal a user at a rate dependent upon a distance from the output device; and means for sending the area information to the means for storing the area information.

13. The system as recited in claim 12, wherein:

the area information includes map information defining a map of an area and output device location information defining the location of the output device in the area; and the wireless device location information defines a location of the wireless device in the area.

14. The system as recited in claim 13, wherein:

means for displaying the wireless device location information, the area information, and the direction information includes a configuration to display the map of the area and the location of the output device on the map.

* * * * *